UNITED STATES PATENT OFFICE.

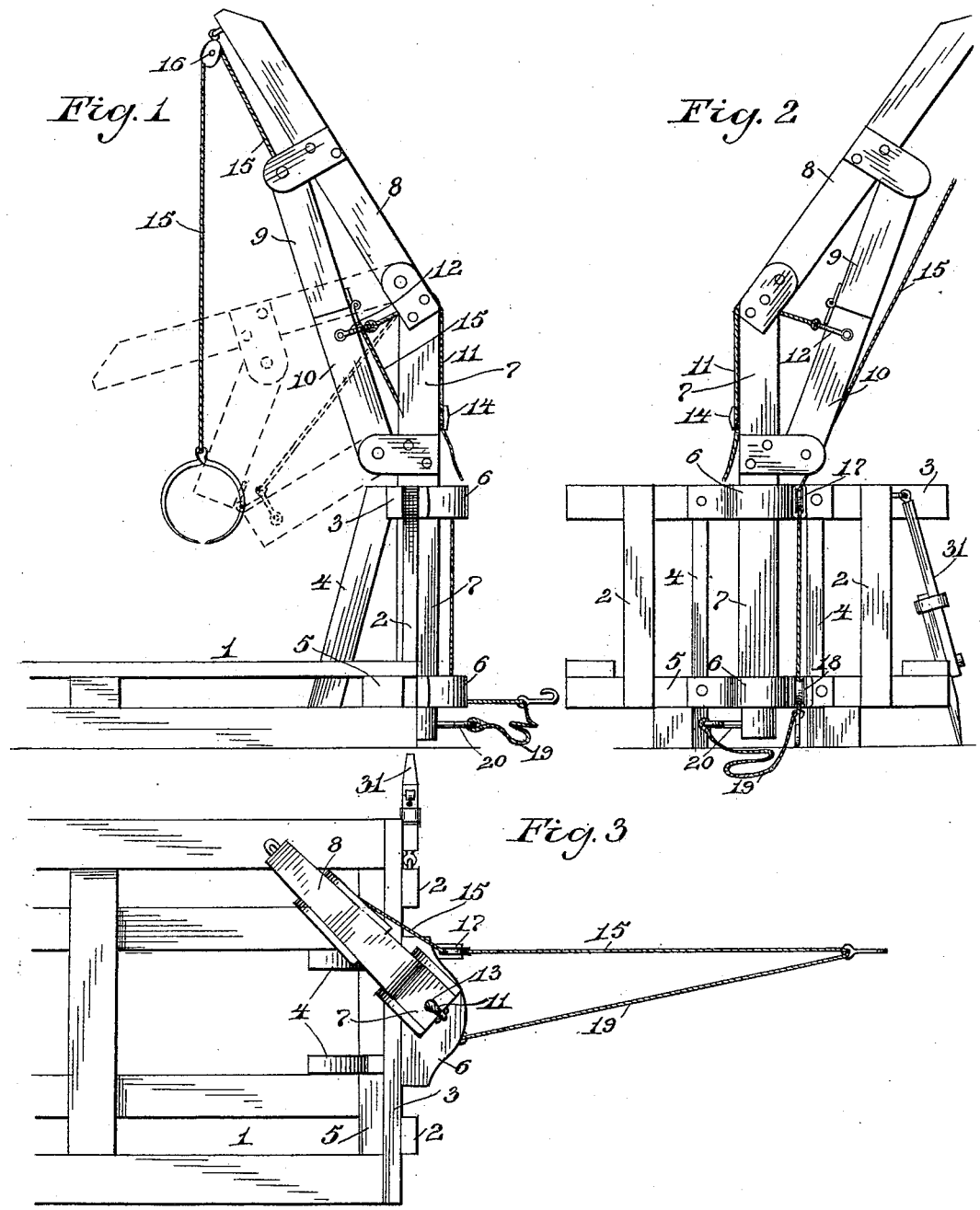

GEORGE D. HOUSTON, OF RUSHVILLE, ILLINOIS.

HAY-LOADER.

SPECIFICATION forming part of Letters Patent No. 496,159, dated April 25, 1893.

Application filed April 9, 1891. Serial No. 388,248. (No model.)

*To all whom it may concern:*

Be it known that I, GEORGE D. HOUSTON, a citizen of the United States, residing at Rushville, in the county of Schuyler and State of Illinois, have invented a new and useful Hoisting Attachment to Hay-Racks, of which the following is a specification.

The invention relates to improvements in hay loaders.

The object of the present invention is to provide a hoisting attachment for hay racks adapted to be operated by a draft animal to carry hay and the like from a shock and deposit it on the rack.

The invention consists in the construction and novel combination and arrangement of parts hereinafter fully described, illustrated in the accompanying drawings and pointed out in the claims hereto appended.

In the drawings:—Figure 1 is a side elevation of a hay rack provided with a carrier or crane constructed in accordance with this invention, the jib of the crane being arranged longitudinally of the rack. Fig. 2 is a rear elevation, the jib being arranged transversely of the rack. Fig. 3 is a plan view.

Referring to the accompanying drawings, 1 designates a hay rack designed to be mounted on suitable running gear in the usual manner and provided at its rear end with a frame consisting of uprights 2, a top cross-bar 3 and inclined braces 4 secured to the rack and the inner face of the top cross-bar 3. The cross-bar 5 of the rack 1 and the top piece 3 of the frame are provided with bearings 6 in which is journaled the post 7 of a crane and pivoted to the upper end of the post is an arm or jib 8, which is adapted to be raised to an operative position and lowered therefrom to enable the hay wagon to pass through a farm gate or into a barn, as the crane or carrier is designed to form a permanent portion of the hay rack. To the post 7 and the jib 8 are pivotally connected two bars 9 and 10 which have their adjacent squared ends hinged together, whereby the jib is adapted to be readily raised and lowered by a rope 11 having one end secured to a bail 12 arranged at the hinged end of the bar 10 and having its ends provided with eyes and secured to the sides of the bar, and the rope 11 passes through an opening 13 in the upper end of the post and is secured to a projection 14 to hold the jib in its raised or operative position. When the jib is in its raised position, as seen in Fig. 1, the squared ends of the bars 9 and 10, which together form an inclined brace, are in contact and said bars are in alignment, as shown in full lines, thereby enabling said brace to perform its function without the aid of securing or retaining devices, except such as is offered by rope 11, which prevents the bars from being thrown out of position by jarring. Therefore, when it is required to bring the jib to its operative position it is simply necessary to draw the rope 11 until the adjacent ends of bars 9 and 10 come in contact.

The hoisting rope 15 is provided at one end with a hay fork and passes around a pulley 16 at the outer end of the crane and over pulleys 17 and 18 arranged on the bearings 6 and it has its other end provided with a draft hook. By drawing the hoisting rope 15 the hay fork and its load of hay is raised to the desired elevation and by a continuous drawing of the rope the crane is turned by a rope 19, which extends from the draft hook to an arm 20 extending from the lower end of the post and arranged diametrically opposite the jib and provided at its outer end with an eye to receive the said rope 19. By this construction after the fork and its load of hay has been elevated, the crane will be turned to carry the hay over the hay rack where it is deposited.

The rack is prevented tilting during the operation of the hoisting attachment by an adjustable brace 31 which is hinged to the top of the frame at one side.

The crane or hoisting attachment may be arranged at the center of the rack and be swung over the end.

The arm 20 which projects to the rear, or directly opposite to the jib, is connected to the draft-hook by a slack rope 19, as above mentioned, whereby said rope is not extended or made taut until the rope 15 has been drawn sufficiently to raise the hay-fork with its load above the plane of the rack. Therefore, the crane will not begin to turn until the fork is above the plane of the rack, and in order to turn the crane the draft upon ropes 15 and 19 is in the same direction as to elevate the load, namely, directly from the machine. No side draft is necessary.

What I claim is—

A hay-loader comprising a hay-rack, vertical post 7, mounted in bearing-blocks, jib 8, toggle-bars 9, 10, having their adjoining ends squared, an adjusting-rope 11 to enable said bars to be brought into alignment and thereby form a brace to support the jib in its operative position, a hoisting-rope provided with a draft-hook, guide-pulleys for said rope, an arm 20, secured to the lower end of the mast and projecting therefrom in a diametrically opposite direction to the jib, and a slack rope 19, secured at one end to the arm 20 and at the other to the draft hook and adapted to be drawn taut when the load has been raised above the plane of the rack, substantially as specified.

In testimony that I claim the foregoing as my own I have hereto affixed my signature in presence of two witnesses.

GEORGE D. HOUSTON.

Witnesses:
GEORGE W. KRUSE,
W. G. BABCOCK.